(12) United States Patent
Graham et al.

(10) Patent No.: US 8,212,823 B2
(45) Date of Patent: Jul. 3, 2012

(54) SYSTEMS AND METHODS FOR ACCELERATING SUB-PIXEL INTERPOLATION IN VIDEO PROCESSING APPLICATIONS

(75) Inventors: Carl Norman Graham, London (GB); Kar-Lik Wong, Wokingham (GB); Simon Jones, London (GB); Aris Aristodemou, London (GB)

(73) Assignee: Synopsys, Inc., Mountain View, CA (US)

( * ) Notice: Subject to any disclaimer, the term of this patent is extended or adjusted under 35 U.S.C. 154(b) by 1354 days.

(21) Appl. No.: 11/528,325

(22) Filed: Sep. 28, 2006

(65) Prior Publication Data

US 2007/0070080 A1    Mar. 29, 2007

Related U.S. Application Data

(60) Provisional application No. 60/721,108, filed on Sep. 28, 2005.

(51) Int. Cl.
*G06T 13/00* (2011.01)
(52) U.S. Cl. ...................................... 345/475
(58) Field of Classification Search .................. 345/475
See application file for complete search history.

(56) References Cited

U.S. PATENT DOCUMENTS

| 5,422,964 | A | 6/1995 | Devimeux et al. |
| 5,884,057 | A | 3/1999 | Blomgren et al. |
| 5,892,847 | A | 4/1999 | Johnson |
| 5,923,892 | A | 7/1999 | Levy |
| 6,377,970 | B1 | 4/2002 | Abdallah et al. |
| 6,757,019 | B1 | 6/2004 | Hsieh et al. |
| 6,853,683 | B2 | 2/2005 | Song et al. |
| 6,865,663 | B2 | 3/2005 | Barry |
| 6,950,929 | B2 | 9/2005 | Chung et al. |
| 7,050,504 | B2 | 5/2006 | Joch et al. |
| 7,079,147 | B2 | 7/2006 | Wichman et al. |
| 7,180,943 | B1 | 2/2007 | Arlid et al. |
| 7,215,823 | B2 | 5/2007 | Miura et al. |
| 7,277,592 | B1 | 10/2007 | Lin |
| 7,336,720 | B2 | 2/2008 | Martemyanov et al. |
| 7,424,501 | B2 | 9/2008 | Macy, Jr. |
| 7,457,362 | B2 | 11/2008 | Sankaran |
| 7,539,714 | B2 | 5/2009 | Macy, Jr. et al. |
| 2002/0025001 | A1 | 2/2002 | Ismaeil et al. |

(Continued)

FOREIGN PATENT DOCUMENTS

EP    1 503 595    2/2005

(Continued)

OTHER PUBLICATIONS

Smith, et al, "The Astronautics ZS-1 Processor", Proceedings of the International Conference on Computer Design : VLSI in Computers and Processors (ICCD). New York, 10/3-5; Oct. 3, 1988; pp. 307-310.

(Continued)

*Primary Examiner* — Edward Martello
(74) *Attorney, Agent, or Firm* — Fenwick & West LLP

(57) ABSTRACT

A data path for a SIMD-based microprocessor is used to perform different simultaneous filter sub-operations in parallel data lanes of the SIMD-based microprocessor. Filter operations for sub-pixel interpolation are performed simultaneously on separate lanes of the SIMD processor's data path. Using a dedicated internal data path, precision higher than the native precision of the SIMD unit may be achieved. Through the data path according to this invention, a single instruction may be used to generate the value of two adjacent sub-pixels located diagonally with respect to integer pixel positions.

18 Claims, 4 Drawing Sheets

U.S. PATENT DOCUMENTS

| | | |
|---|---|---|
| 2004/0054877 A1 | 3/2004 | Macy et al. |
| 2004/0267856 A1 | 12/2004 | Macy |
| 2006/0047934 A1 | 3/2006 | Schmisseur et al. |
| 2007/0071101 A1 | 3/2007 | Topham |
| 2007/0071106 A1 | 3/2007 | Graham et al. |
| 2007/0073925 A1 | 3/2007 | Lim et al. |
| 2007/0074004 A1 | 3/2007 | Wong et al. |
| 2007/0074007 A1 | 3/2007 | Topham et al. |
| 2007/0074012 A1 | 3/2007 | Graham et al. |

FOREIGN PATENT DOCUMENTS

| | | |
|---|---|---|
| GB | 2365583 | 2/2002 |
| WO | WO-93-08526 | 4/1993 |
| WO | WO-2006/096612 | 9/2006 |

OTHER PUBLICATIONS

Wiegand, T., et al., "Rate-Constrained Coder Control and Comparison of Video Coding Standards," IEEE Transactions on Circuits and Systems for Video Technology, 13(7):688-703; Jul. 1, 2003.

Osako, F., et al., "A Dynamic Computation Resource Scalable Algorithm for Software Video CODEC," NTG Fachberichte, VDE Verlag, 143:515-518 ; Sep. 10, 1997.

Ray, A., et al., "Complexity-Distortion Analysis of H.264/JVT Decoders on Mobile Devices," Picture Coding Symposium PSC, http://www.egr.msu/edu/waves/people/Radha_files/2004/PSC04.pdf (Dec. 2004).

200

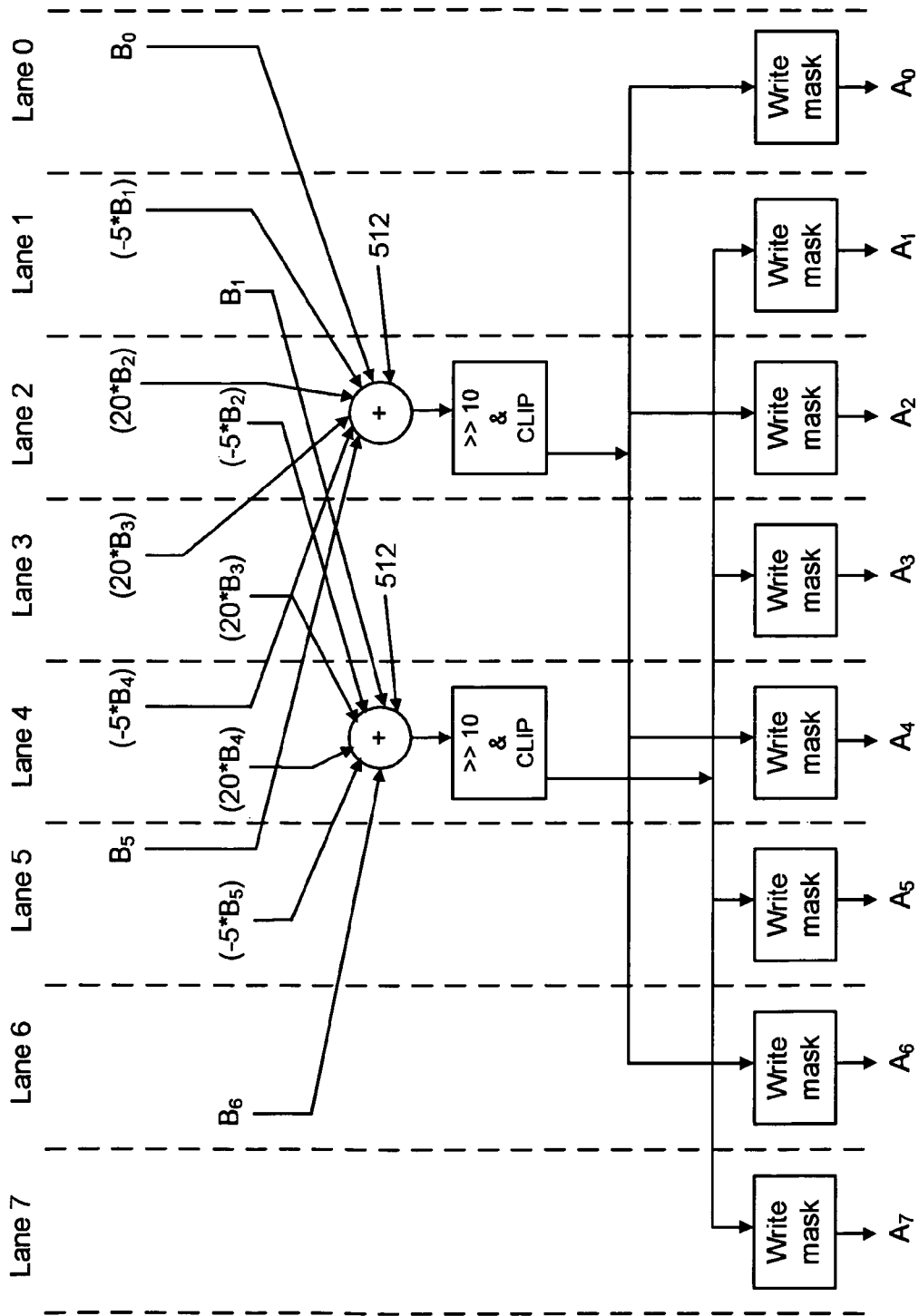

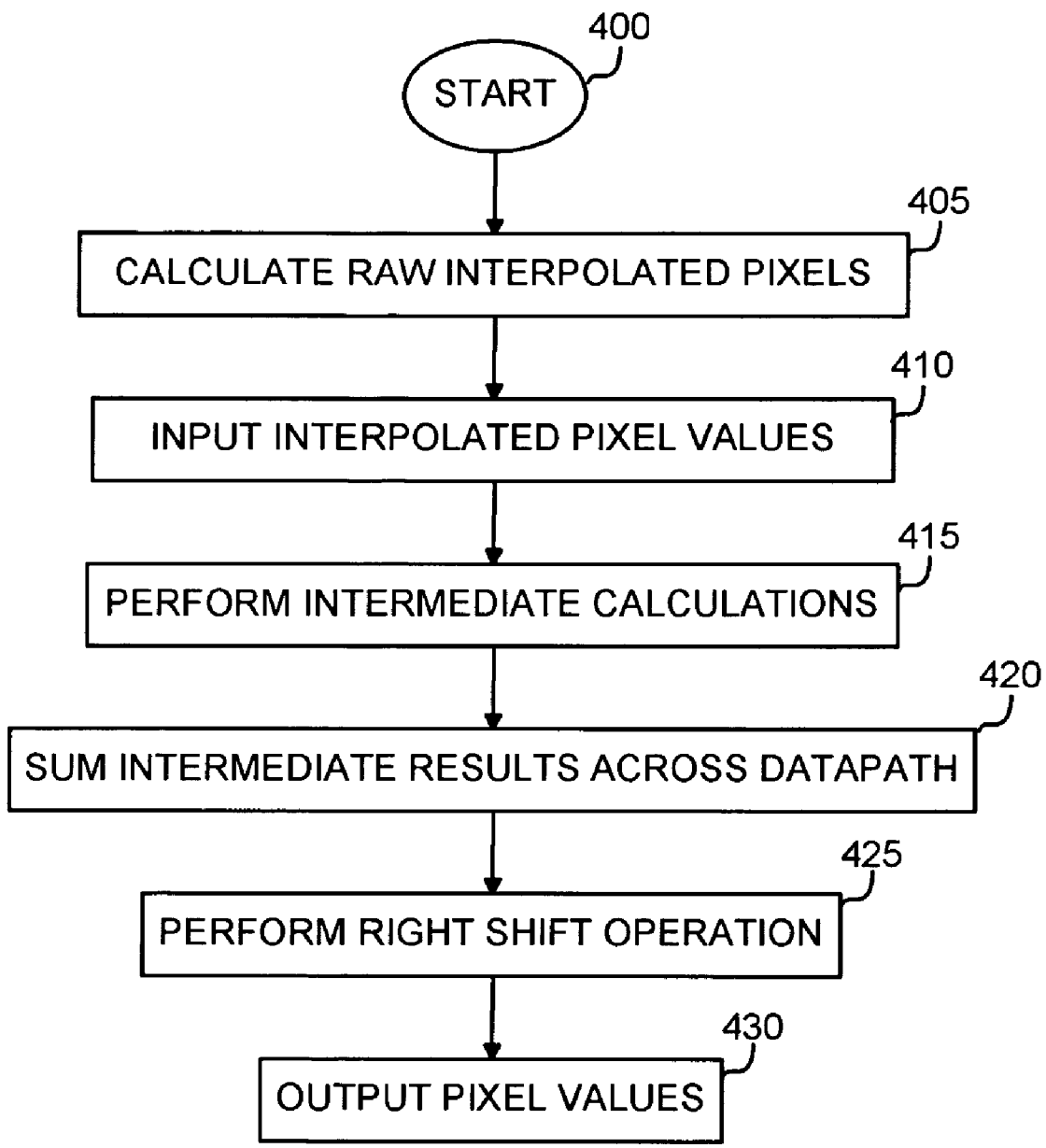

SYSTEMS AND METHODS FOR ACCELERATING SUB-PIXEL INTERPOLATION IN VIDEO PROCESSING APPLICATIONS

CROSS REFERENCE TO RELATED APPLICATIONS

This application claims priority to U.S. Provisional Patent Application No. 60/721,108 titled "SIMD Architecture and Associated Systems and Methods," filed Sep. 28, 2005, the disclosure of which is hereby incorporated by reference in its entirety.

FIELD OF THE INVENTION

The invention relates generally to microprocessor-based video processing and more particularly to systems and methods for performing sub-pixel interpolation in motion estimation-based video processing applications.

BACKGROUND OF THE INVENTION

Digital video sequences, like ordinary motion pictures recorded on film, comprise a sequence of still images, the illusion of motion being created by displaying the images one after the other at a relatively fast frame rate, typically 15 to 30 frames per second. Because of the relatively fast frame rate, images in consecutive frames tend to be quite similar and thus contain a considerable amount of redundant information. For example, a typical scene may comprise some stationary elements, such as background scenery, and some moving areas, which may take many different forms, for example the face of a newsreader, moving traffic and so on. Alternatively, the camera recording the scene may itself be moving, in which case all elements of the image have the same kind of motion. In many cases, this means that the overall change between one video frame and the next is rather small.

Each frame of raw, that is uncompressed, digital video sequence comprises a very large amount of image information. Each frame of an uncompressed digital video sequence is formed from an array of image pixels. For example, at a resolution of 640 by 480 pixels, there are 307,200 pixels in a single frame. The amount of data required to represent this frame is a direct function of the pixel depth, that is, the number of unique color values a given pixel may take. Each pixel is represented by a certain number of bits, which carry information about the luminance and/or color content of the region of the image corresponding to the pixel. Commonly, a so-called YUV color model is used to represent the luminance and chrominance content of the image. The luminance, or Y, component represents the intensity (brightness) of the image, while the color content of the image is represented by two chrominance components, labeled U and V.

Video compression methods are based on reducing the redundant and perceptually irrelevant parts of video sequences. Thus, video compression codecs perform motion estimation to calculate the difference between successive frames and encode that difference rather than all the data in the frame itself. This means that motion between frames of a digital video sequence can only be represented at a resolution which is determined by the image pixels in the frame (so-called integer pixel resolution). Real motion, however, has arbitrary precision. Typically, modeling of motion between video frames with integer pixel resolution is not sufficiently accurate to allow efficient minimization of the prediction error (PE) information associated with each macroblock/frame. That is, when performing motion estimation, in some cases, the previous pixel block has moved a non-integer number of pixels from its previous location requiring interpolation to determine the pixel values at these non-integer locations. Therefore, to enable more accurate modeling of real motion and to help reduce the amount of PE information that must be transmitted from encoder to decoder, many video coding standards allow motion vectors to point 'in between' image pixels. In other words, the motion vectors can have 'sub-pixel' resolution. For example, the H.264 Video CODEC uses ½ and ¼ pixel resolutions. However, these functions can be a performance bottleneck in codec implementations since allowing motion vectors to have sub-pixel resolution adds to the complexity of the encoding and decoding operations that must be performed.

SUMMARY OF THE INVENTION

In view of the foregoing, at least one embodiment of the invention may provide an instruction to accelerate H.264 video codec sub-pixel interpolation in a microprocessor. The instruction according to this embodiment may comprise a six tap finite impulse response (FIR) filter for applying to an array of 16-bit luma components of adjacent pixels to interpolate the luma components of pixels half-way between integer pixel positions whereby, the pixel value to be interpolated is located diagonally between adjacent integer-positioned pixels. It should be appreciated that an important aspect of this instruction is that it provides a dedicated internal data path with the required arithmetic precision which is higher than the precision a single instruction multiple data (SIMD) machine is designed to support. The alternative is to widen all data paths of the SIMD machines to increase the precision supported for all operations. However, this is a wasteful solution because most video codec operations do not require such high precision. Another important aspect of this instruction is that it exploits data locality in the filter operations and computes the interpolated luma components of two adjacent pixels simultaneously. This is achieved by performing different operations required by the filter in different data lanes. This circumvents the usual restriction in typical SIMD machines in which all data lanes perform the same operation but, at the same time, the very high data bandwidth provided by the wide SIMD data path is efficiently utilized.

Another embodiment according to the invention provides a data path for performing heterogeneous arithmetic interpolation operations in a SIMD processor. The data path according to this embodiment comprises a set of equal sized parallel data lanes adapted to receive data inputs in the form of interpolated pixel values, perform simultaneous, lane specific operations on the data inputs, to derive intermediate values, and to sum the intermediate values, perform right shift to the sum and distribute the summation results across multiple data lanes.

An additional embodiment according to the invention provides a method for accelerating sub-pixel interpolation in a SIMD processor. The method according to this embodiment comprises determining a set of interpolated pixel values corresponding to sub-pixel positions horizontally between integer pixel locations, inputting the set of interpolated pixel values into an N lane SIMD data path, where N is an integer indicating the number of parallel data lanes of the SIMD processor, performing separate, simultaneous intermediate filter operations in each lane of the N lane data path, summing the intermediate results and perform right shifting to the sums, and outputting a value of two adjacent sub-pixels located diagonally with respect to integer pixel locations and in the same row as the set of interpolated pixel values.

These and other embodiments and advantages of the present invention will become apparent from the following detailed description, taken in conjunction with the accompanying drawings, illustrating by way of example the principles of the invention.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

FIG. 3 is a schematic diagram illustrating a SIMD topology for performing heterogeneously parallel mathematical operations according to at least one embodiment of the invention; and FIG. 4 is a flow chart of an exemplary method for accelerating sub-pixel interpolation according to at least one embodiment of the invention.

DETAILED DESCRIPTION

The following description is intended to convey a thorough understanding of the embodiments described by providing a number of specific embodiments and details involving microprocessor architecture and systems and methods for a filter-based interpolation for performing sub-pixel interpolation in video codec such as sub-pixel interpolation as specified in the H.264 video codec. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

Single instruction multiple data (SIMD) architectures have become increasingly important as demand for video processing in electronic devices has increased. These devices exploit the data parallelism that is abundant in data manipulations often found in media related applications. Data parallelism exists when a large mass of data of uniform type needs the same instruction performed on it. Thus, in contrast to a single instruction single data (SISD) architecture, in a SIMD architecture, a single instruction may be used to effect an operation on a wide vector of data. SIMD architecture exploits parallelism in the data stream while SISD can only operate on data sequentially.

Two emerging video codec standards designed to facilitate high quality video required by today's electronic devices are the H.264 and VC1 standards. H.264 was jointly developed by the Moving Picture Experts Group (MPEG) and the International Telecommunication Union (ITU). It is also known as MPEG-4 Part 10 Advanced Video Coding (AVC). VC1 is a video codec specification based on MICROSOFT WINDOWS Media Video (WMV) 9 compression technology that is currently being standardized by the Society of Motion Picture and Television Engineers (SMPTE).

One key attribute of a video compression application is the bit-rate of the compressed video stream. Codecs that target specific applications are designed to stay within the bit-rate constraints of these applications, while offering acceptable video quality. DVDs use 6-8 Mbps with MPEG-2 encoding. However, emerging digital video standards such as HDTV and HD-DVD can demand up to 20-40 Mbps using MPEG-2. Such high bit-rates translate into huge storage requirements for HD-DVDs and a limited number of HDTV channels. Thus, a key motivation for developing a new codec is to lower the bit-rate while preserving or even improving the video quality relative to MPEG-2. This was the motivation that led to the development of both the H.264 and VC1 codecs. These codecs achieve significant advances in improving video quality and reducing bandwidth, but at the cost of greatly increased computational complexity at both the encoder and decoder.

Figure 1:
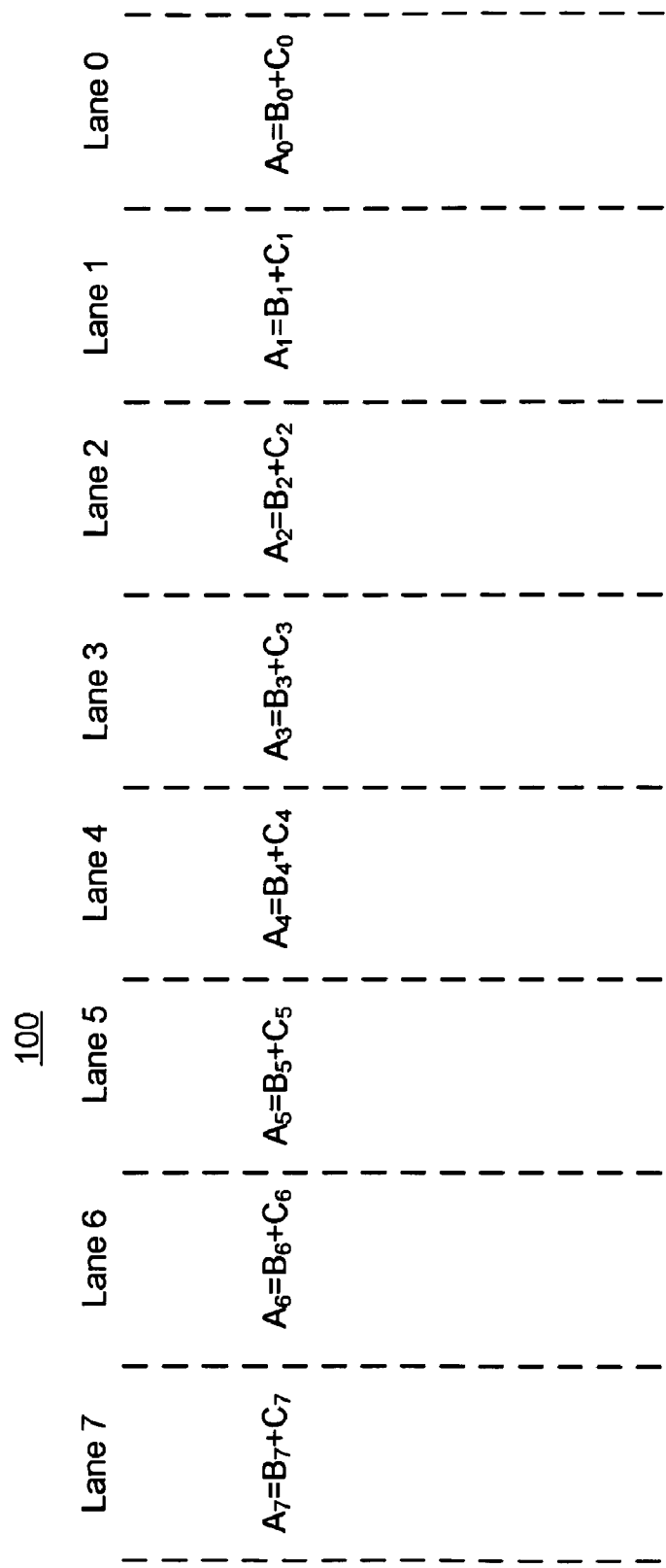
FIG. 1 is a schematic diagram illustrating a SIMD topology for performing homogeneously parallel mathematical operations.

Referring now to FIG. 1, a schematic diagram illustrating a SIMD topology for performing homogeneously parallel mathematical operations is provided. In a typical SIMD-base system, the data path is divided into several identical lanes, each performing the same operation on different slices of the wide input data as required by the instruction being executed, such as the parallel data path 100 in FIG. 1. This Figure illustrates an example in which a typical SIMD machine is performing eight 16-bit additions on the N-bit inputs B and C to produce an N-bit output A. In the case of an 8×16 SIMD unit having 8 16 bit data lanes, A, B and C are 128 bits in width. In the Figure, we use the notation $K_n$ to represent the slice $K[(16n+15):16n]$ of the 128-bit data $K[127:0]$, for example, $B_6$ is the slice $B[111:96]$ of the input B. To implement filter operations using the type of SIMD machine depicted in FIG. 1, the filter must be broken down into primitive operations such as additions and multiplications. All theses primitive operations must then be performed in parallel in each data lane of the machine, effectively performing several independent filter operations in parallel on different data sets. This type of parallelism may be characterized as homogeneous to the extend that each data lane is performing the same operation. In the example topology 100 in FIG. 1, eight such filter operations would be performed in parallel. Also all primitive operations would have to be done in the native precision supported by the SIMD machine—that is, the maximum width of each data lane, such as 16 bits. In cases where the filter operation requires intermediate computations to be done in a higher precision, for example 20-bit, than the native precision of the SIMD machine, for example, 16-bit, either the higher precision intermediate computation has to be emulated using multi-precision arithmetic routines, or the native precision of the machine must be widened. The former solution is less than ideal because multi-precision routines take extra cycles to execute and are often inefficiently supported in SIMD machines. Widening the native precision of the SIMD machine requires all architectural and internal data path elements to be made wider and is wasteful if only a small number of intermediate computations out of the entire application require the extra precision. Accordingly, various embodiments of the invention permit a SIMD machine to perform higher precision computations without the shortcomings of these solutions.

Figure 2:
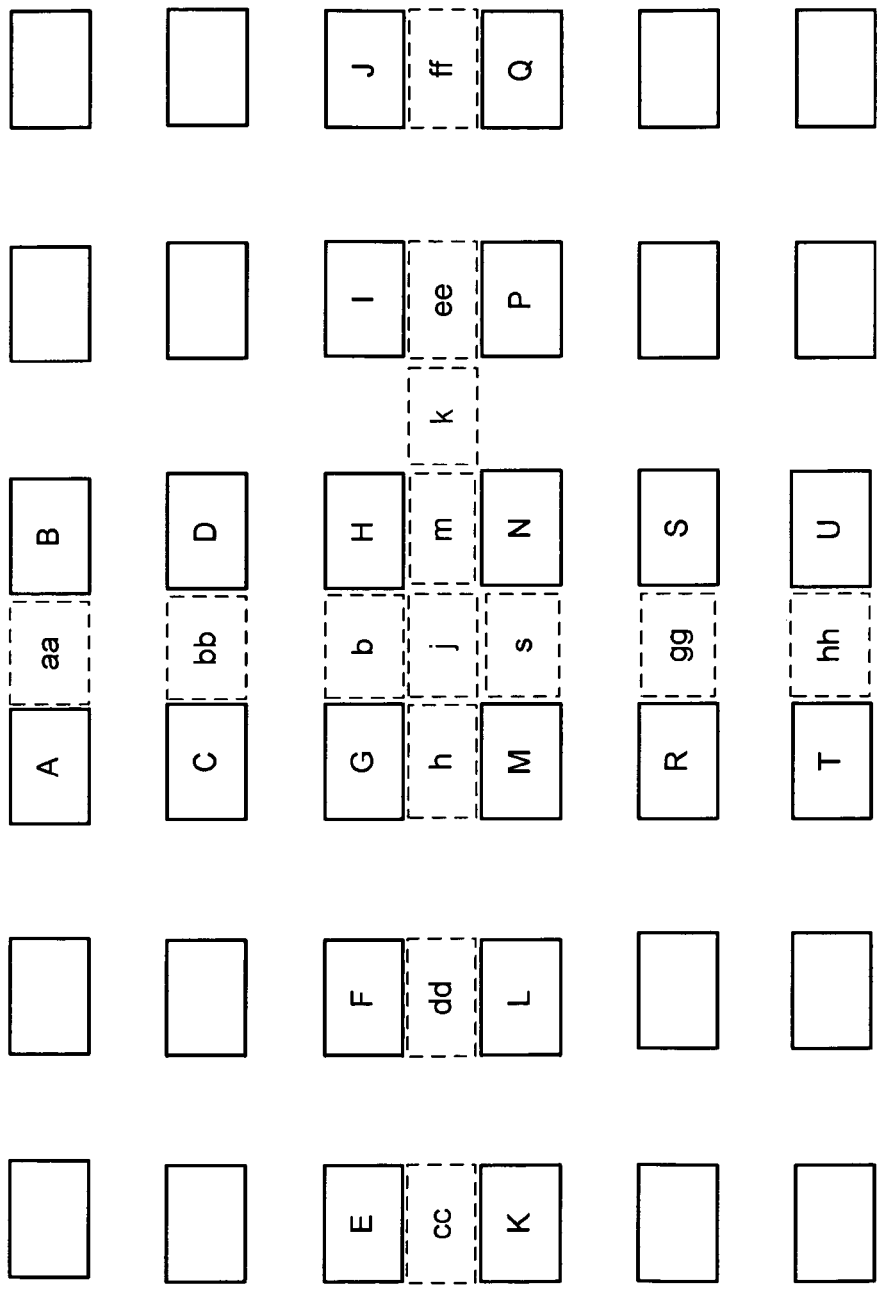
FIG. 2 is a diagram illustrating an array of pixels for describing an implementation of a filter-based interpolation method for performing sub-pixel interpolation in the H.264 video codec standard according to at least one embodiment of the invention.

Referring now to FIG. 2, a diagram illustrating an array of pixels for describing an implementation of a filter-based interpolation method for performing sub-pixel interpolation in the H.264 video codec standard according to at least one embodiment of the invention is provided. The array of pixels 200 illustrates the problem of inter-pixel interpolation. As noted herein, the H.264 codec specification allows for inter-pixel interpolation down to ½ and ¼ pixel resolutions. In various embodiments of the invention, this process is performed at the SIMD processor level through a six-tap finite impulse response (FIR) filter.

As noted herein, when performing motion estimation, in some cases, the previous block has moved a non-integer number of pixels from its previous location requiring interpolation to determine the pixel values at these non-integer locations. In the array 200 of FIG. 2, pixels A, B, C, D, E, F, G, H, I, J, K, L, M, N, P, Q, R, S, T and U are labeled in a horizontal and vertical configuration at actual pixel locations. Sub-pixels aa, bb, b, cc, dd, h, j, m, k, ee, ff, s, gg, and hh denote sub-pixel locations that are between two adjacent pixels in either the vertical, horizontal or diagonal directions.

In the case where the sub-pixel is either horizontally or vertically between two integer pixel positions (e.g. b, h, m or s in FIG. 2), the value of the interpolated pixel may be given by a six tap FIR filter applied to integer-position pixels with weights 1/32, −5/32, 5/8, 5/8, −5/32 and 1/32. For example, the value of sub-pixel b can be calculated by applying the filter to adjacent integer-position pixels E, F, G, H, I and J, the six pixels surrounding and in the same row as the sub-pixel b. By applying the filter to these pixels, raw interpolated pixel b is obtained, where b=E−5F+20G+20H−5I+J. The interpolated pixel value b can then be obtained by b=clip((b+16)>>5), where clip(a) means to clip the value to a range of 0-255. In applications where the pixels are represented by 8-bit unsigned values, the value of b can be calculated using 16-bit arithmetic.

For cases where the sub-pixel is diagonally between two integer pixel positions (e.g., pixel j in FIG. 2), the filter is applied to the raw interpolated pixels of the closest sub-pixel positions as required by the H.264 standard. The raw interpolated pixels can be selected either horizontally or vertically since each produces the same result. If selected horizontally, the raw interpolated pixels used would be cc, dd, h, m, ee and ff. These correspond to the pixels cc, dd, h, m, ee and ff in FIG. 2 in the same way as b was related to b above, i.e. the raw interpolated pixels are the filter outputs prior to shifting and clipping. If selected vertically, the raw interpolated pixels are aa, bb, b, s, gg and hh which correspond to aa, bb, b, s, gg and hh in FIG. 2. Thus, interpolated pixel j is derived by the equation j=clip(((cc−5dd+20h+20m−5ee+ff)+512)>>10) or, alternatively j=clip(((aa−5bb+20b+20s−5gg+hh)+512)>>10). Because the raw interpolated pixels can have values ranging from 2550 to 10710, intermediate results of the filter function computation, (that is, the result of cc−5dd+20h+20m−5ee+ff) can have values in the range −214200 to 475320 which can only be represented with a 20-bit number when the target sub-pixel is located diagonally between integer pixel positions.

For a SIMD processor using 16-bit precision arithmetic, it is inefficient to perform the necessary 20-bit arithmetic to implement the filter operation on pixels positioned diagonally between integer positions for the reasons discussed above in the context of FIG. 1. Therefore, various embodiments of the invention overcome this inefficiency by providing hardware necessary for a single instruction to perform the entire filter operation. This instruction enables an 8×16-bit SIMD unit to handle the case in the H.264 standard that requires 20-bit math as part of the filter operation on the luma components of pixels. Thus, various embodiments of this invention significantly simplify and accelerate the implementation of the interpolation filter required for the sub-pixel motion vectors specified by the standards. The instruction takes as input 8 16-bit values that are positioned horizontally in a row and are results from vertical 6-tap filter operations previously performed. This input contains sufficient data for two adjacent filter operations to be performed. The two adjacent 6-tap filter operations concurrently using internal 20-bit arithmetic operations, and outputs 2 interpolated luma pixel values.

Given a vector containing elements [s0, s1, s2, s3, s4, s5, s6, s7], the instruction returns a vector containing two 16-bit values [r0, r1]; r0 and r1 may be computed as follows:

$$r0=(s0-5s1+20s2+20s3-5s4+s5+512)>>10$$

$$r1=(s1-5s2+20s3+20s4-5s5+s6+512)>>10$$

If the elements s0 to s6 contain adjacent raw vertically interpolated pixels, the results r0 and r1, after subsequent clipping, are two adjacent interpolated pixels that are diagonally positioned between integer pixel positions, such as pixels j and k of FIG. 2. Thus, a relatively simple instruction is capable of performing the majority of processing necessary to produce these two interpolated pixels. In the context of FIG. 2, if j corresponds to clipped r0, then s0, s1, s2, s3, s4 and s5 are the raw interpolated pixels corresponding to cc, dd, h, m, ee and ff respectively. Result r1 would correspond to the interpolated pixel k between pixel m and pixel ee. The computation of r1 would require a value for pixel s6 which is not shown in FIG. 2.

The particular solution provided by the various embodiments of the invention may be illustrated by way of example in FIG. 3. FIG. 3 is a schematic diagram illustrating a SIMD topology for performing heterogeneously parallel mathematical operations according to at least one embodiment of the invention. In the Figure, two filter operations, such as the aforementioned sub-pixel interpolation filter required in modern video codecs, are performed concurrently. The outputs of these concurrent filter operations correspond to the values of two adjacent interpolated pixels that are at half-pixel diagonal positions, for example, sub-pixels j and k in FIG. 2. In the parallel data path 300 of FIG. 3, each lane performs several operations that are specific to the lane. Intermediate results in all data lanes are then summed up and shifted as required to produce two 16-bit output results. These two results are distributed across all even and odd data lanes respectively and are written back to the corresponding slices of the destination register under the control of a mask mechanism.

Unlike the parallelism of the SIMD architecture of FIG. 1, an important aspect of the embodiments of the current invention is the exploitation of heterogeneous parallelism, in which different data lanes perform different operations, in a SIMD machine that typically only exploits homogeneous parallelism, in which all data lanes perform the same operation. Another important aspect is the dedicated internal data path used to implement the required operations can be adjusted according to the required width of the intermediate computation. Since the input and output data are well within the native precision of the SIMD machine, i.e. 16-bit, and only the intermediate computation requires extra precision, i.e. 20-bit, it is sufficient to only widen the dedicated internal data path while the rest of the SIMD pipeline still just needs to support the native precision it was designed for. Hence the wasteful widening of the entire SIMD pipeline is avoided.

FIG. 4 is a flow chart of an exemplary method for accelerating sub-pixel interpolation according to at least one embodiment of the invention. The method begins in step 400 and proceeds to step 405 where the raw interpolated pixel input values are calculated. In various embodiments, when sub-pixels are located diagonally between integer pixel positions, a filter operation must first be performed to determine the value of the raw interpolated pixels located horizontally or vertically between integer pixels positions, in the same row or column as the target diagonal sub-pixels. Next, in step 410, the intermediate raw interpolated sub-pixels are input into the SIMD data path for performing the interpolation calculation of two diagonally oriented sub-pixels. In various embodiments this is accomplished with a single instruction that inputs the values of 7 raw interpolated pixels allowing for two adjacent diagonally oriented pixels to be determined. Next, in step 415, the intermediate filter calculations are performed in each data lane of the SIMD data path. In various embodiments, this comprises performing multiplication operations to derive the filter coefficients, e.g., $-5s_1+20s_2+20s_3-5s_4$, etc. Next, in step 420, the intermediate results for each of the two sub-pixel calculations are summed across the data path. In step 425, summation results are right shifted by 10-bits. In various embodiments, the results are distributed across odd and even data lanes respectively. Then, in step 430, the results of this operation are written back to corresponding slices of the destination register.

In the method detailed in FIG. 4, steps 410 through 430 are performed with a single instruction thereby accelerating the sub-pixel interpolation process significantly. Step 405 is a pre-computation that is required as an input for the instruction according to the various embodiments of the invention. As a post-processing step not shown in the chart, the output of step 430 has to be clipped to produce the actual interpolated sub-pixel.

The embodiments of the present inventions are not to be limited in scope by the specific embodiments described herein. For example, although many of the embodiments disclosed herein have been described with reference to systems and methods for accelerating sub-pixel interpolation for processor-based motion estimation, the principles herein are equally applicable to other aspects of microprocessor design and function. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. A SIMD processor comprising a data path for performing heterogeneous arithmetic interpolation operations, the data path comprising:
    a set of equal sized parallel data lanes adapted to:
        receive data inputs in the form of interpolated pixel values;
        perform heterogeneous parallel lane specific operations on the data inputs, to derive intermediate values, wherein heterogeneous parallel lane specific operations are different from each other and are performed in parallel in different lanes; and
        sum the intermediate values, perform right shift to the sum and distribute the results across multiple data lanes.

2. The SIMD processor according to claim 1, wherein the set of equal sized parallel data lanes comprise a set of 8 16-bit data lanes.

3. The data path according to claim 2, where the raw interpolated pixel values are 16-bit raw interpolated luma pixel components.

4. The SIMD processor according to claim 3, wherein performing simultaneous, lane specific operations on the data inputs comprises performing distinct intermediate filter calculations in two or more of the respective filter lanes simultaneously.

5. The SIMD processor according to claim 4, wherein summing the intermediate values comprises allocating the intermediate values into two groups, right shifting the sums and distributing the two results across two or more of the data lanes.

6. The SIMD processor according to claim 4, wherein the distinct filter calculations and summing operations are performed using an internal data path having a greater precision than a single lane of the SIMD data path.

7. The SIMD processor according to claim 5, wherein distributing the two results across two or more of the data lanes comprises distributing one result across the four even data lanes and the other result across the four odd data lanes.

8. The SIMD processor according to claim 7, wherein the parallel data lanes are further adapted to write the distributed sums to corresponding slices of a destination register as two interpolated luma pixel components.

9. The SIMD processor according to claim 8, wherein the two interpolated luma pixel values comprise interpolated values of two adjacent interpolated pixels oriented diagonally between integer pixel positions in a block of pixels.

10. A method for accelerating sub-pixel interpolation in a SIMD processor comprising:
    determining a set of interpolated pixel values corresponding to sub-pixel positions horizontally between integer pixel locations;
    inputting the set of interpolated pixel values into an N lane SIMD data path, where N is an integer indicating the number of parallel data lanes of the SIMD processor;
    performing separate heterogeneous parallel intermediate filter operations in each lane of the N lane data path, wherein heterogeneous parallel operations are different from each other and are performed in parallel in different lanes of the N lane data path;
    summing the intermediate results and perform right shifting to the sums; and
    outputting a value of two adjacent sub-pixels located diagonally with respect to integer pixel locations and in the same row as the set of interpolated pixel values.

11. The method according to claim 10, wherein determining a set of interpolated pixel values corresponding to sub-pixel positions horizontally between integer pixel locations comprises determining a set of 7 raw interpolated pixel values.

12. The method according to claim 11, wherein inputting the set of interpolated pixel values into an N lane SIMD data path comprises inputting the set of interpolated pixel values into a 8 lane SIMD data path having a 16-bit precision in each lane.

13. The method according to claim 12, wherein performing separate, simultaneous intermediate filter operations in each lane of the 8 lane data path comprises performing filter multiplication operations using an internal data path having a greater precision than a particular data lane.

14. The method according to claim 13, wherein combining the intermediate results comprises summing and shifting the results into two raw interpolated pixels.

15. The method according to claim 14, wherein summing and shifting comprises performing these operations with the internal data path having a greater precision than the single data lane precision.

16. The method according to claim 14, wherein the results corresponding to two raw interpolated pixels are distributed across the data lanes.

17. The method according to claim 16, wherein distributing the results across the data lanes comprises distributing the one of the results across the even data lanes and the other result across the odd data lanes.

18. The method according to claim 17, wherein outputting a value of two adjacent sub-pixels comprises writing the distributed results to corresponding slices of a destination register as two interpolated luma pixel components.

* * * * *